United States Patent
Fleury et al.

(10) Patent No.: US 7,358,496 B2
(45) Date of Patent: Apr. 15, 2008

(54) INFRARED NIGHT VISION SYSTEM, IN COLOUR

(75) Inventors: Benoist Fleury, Bobigny Cedex (FR); Philippe Hidden, Bobigny Cedex (FR); David Hue, Bobigny Cedex (FR)

(73) Assignee: Valeo Vision, Bobigny Cedex (FR)

(*) Notice: Subject to any disclaimer, the term of this patent is extended or adjusted under 35 U.S.C. 154(b) by 123 days.

(21) Appl. No.: 10/888,812

(22) Filed: Jul. 9, 2004

(65) Prior Publication Data

US 2005/0040333 A1    Feb. 24, 2005

(30) Foreign Application Priority Data

Jul. 11, 2003  (FR) .................................. 03 08583

(51) Int. Cl.
  *H01L 25/00*  (2006.01)
(52) U.S. Cl. ...................... 250/332; 250/332
(58) Field of Classification Search ................ 250/332, 250/208.1
  See application file for complete search history.

(56) References Cited

U.S. PATENT DOCUMENTS

| | | | |
|---|---|---|---|
| 5,001,558 A | 3/1991 | Burley et al. | |
| 5,729,016 A * | 3/1998 | Klapper et al. | 250/334 |
| 5,910,816 A | 6/1999 | Fontenot et al. | |
| 6,150,930 A | 11/2000 | Cooper | |
| 6,429,429 B1 | 8/2002 | Fohl et al. | |
| 6,614,579 B2 * | 9/2003 | Roberts et al. | 359/267 |
| 6,795,237 B1 * | 9/2004 | Marinelli et al. | 359/353 |
| 6,815,680 B2 * | 11/2004 | Kormos | 250/330 |
| 2002/0118282 A1 | 8/2002 | Nakamura | |
| 2005/0029458 A1 * | 2/2005 | Geng et al. | 250/347 |
| 2005/0200700 A1 * | 9/2005 | Schofield et al. | 348/148 |
| 2005/0232469 A1 * | 10/2005 | Schofield et al. | 382/104 |
| 2005/0247862 A1 * | 11/2005 | Faytlin et al. | 250/214 VT |
| 2005/0269481 A1 * | 12/2005 | David et al. | 250/208.1 |

OTHER PUBLICATIONS

French Search Report dated Dec. 8, 2003.

* cited by examiner

*Primary Examiner*—David Porta
*Assistant Examiner*—Marcus H Taningco
(74) *Attorney, Agent, or Firm*—Morgan & Finnegan LLP

(57) ABSTRACT

A night vision method and system for producing a colour infrared image of a road scene situated in front of a vehicle. At least one projection device emits an infrared light towards the road scene. A colour sensor captures a colour image of the road scene and a monochrome infrared sensor captures a monochrome infrared image of the road scene. The colour and monochrome infrared images are combined to obtain the colour infrared image of the road scene.

6 Claims, 2 Drawing Sheets

INFRARED NIGHT VISION SYSTEM, IN COLOUR

FIELD OF THE INVENTION

The invention concerns a night vision system for motor vehicles. This night vision system, of the infrared type, makes it possible to produce images, at blast partly in colour, of the road scene unfolding in front of the vehicle. The invention also concerns a method of implementing this system.

The invention finds applications in the field of vehicles travelling on the road such as for example cars. It finds in particular applications in the field of night vision for such vehicles.

BACKGROUND OF THE INVENTION

Having regard to the large number of vehicles travelling on the roads, it is necessary to procure, for these vehicles and their drivers, the best possible adapted road vision in order to reduce risks of accidents. In particular at night, it is important for the driver to be able to have sufficiently detailed vision of the road extending in front of him as well as the sides of this road. In other words, for questions of safety, it is sought to improve the night vision of the road scene for the driver of the vehicle.

For this, there exist night vision systems in which a lighting device, of the spotlight type, emits an infrared light beam in the direction of the road, in front of the vehicle. This infrared light is reflected by the various objects situated in the road scene. This reflection of the infrared light is more or less intense according to the nature of the object and its distance with respect to the lighting device. A sensor sensitive to infrared radiation, situated generally in the vehicle, provides capture of this infrared radiation. It then supplies an infrared image of the road scene extending in front of the vehicle. Such a system, with the emission of infrared radiation, reflection of these rays and capture of the reflected rays, is referred to as an "active system". It makes it possible to detect the near infrared, that is to say the radiation having a wavelength which may attain 1100 nm. An example of an image obtained with an active system is shown in FIG. 1. This image makes it possible to detect a vehicle with a pedestrian on the road alongside the vehicle. However, it is not possible to determine whether the lights of this vehicle are the front lights or the brake lights of the vehicle. It is therefore not possible to know in which direction the vehicle is placed. This image also makes it possible to see light spots on the right of the road; these light spots seem to be road signs, but it is impossible to read the information written on these panels.

There also exist systems for detecting far infrared. These systems are called "passive systems". In these systems, a sensor captures the far infrared light, that is to say radiation having a wavelength of around 10 μm. Such systems make it possible to capture only the infrared radiation emitted by the objects themselves. In other words, it is a case of measuring the temperature of the elements in the road scene. In such a passive system, the sensor captures the head detected, as an infrared light. One example of an image obtained by a passive system is shown in FIG. 2. This image makes it possible to display a first vehicle and, further away, a second vehicle with pedestrians close by. However, it is not possible to determine, on this image, whether the lights of these vehicles are the front lights or the brake lights. It is therefore not possible to know in which direction these vehicles are placed.

All these systems have drawbacks. In particular, the passive systems cannot detect cold objects. This drawback is aggravated further when moving objects, sharing the same space as the vehicle, are invisible. This is the case in particular with cars which are still cold, which have been travelling only for a few moments and where the glasses on the rear lights have not had time to heat up. This is because the large quantity of far infrared radiation emitted by the lamps of the rear lights pass through neither plastic nor glass. Likewise, the illumination of the brake lights, the direction indicators or the hazard warning lights do not instantaneously heat up the glass of the said light. They are therefore undetectable by a passive system.

On the other hand, active systems react too well to light sources such as the rear lights of vehicles, three-coloured lights on the road, etc. These lights, emitting infrared radiation, dazzle the sensor and create a kind of halo of light all around the image of the object in question, which makes the contour of the object undefined. This dazzle is referred to as "blooming".

Moreover, with these active or passive systems, the road scene is seen at wavelengths which are outside the visible spectrum and therefore by nature foreign to the concept of colour. The image of the road scene obtained by these systems is therefore monochrome (that is to say black and white) with various levels of grey, the light levels corresponding to the objects emitting or reflecting infrared and the dark levels corresponding to the objects not emitting or reflecting infrared. However, with a monochrome image, it is sometimes difficult to know precisely what type of object is concerned. For example, on the images in FIGS. 1 and 2, it is not possible to detect whether it is a case of front or rear lights of the vehicles. Likewise, it is not possible to read the information written on the road signs.

Active or passive systems attempt to remedy these drawbacks by processing the captured image before displaying it. One of these processings consists of a video reversal of the image. This video reversal makes the objects detected as dark light and makes the objects detected as bright dark. An example of an image processed by video reversal is shown in FIG. 3. In this example, the video reversal makes it possible to display the road scene better and to better imagine to what each object in the road scene corresponds. In this example, the video reversal makes it possible to show that the first vehicle is coming in the opposite direction and that the second vehicle is stationary in the same direction as the vehicle in which the system is mounted.

Another processing of the image captured proposes to artificially colour the image of the road scene. This treatment consists of associating with each level of grey of the image captured, an artificial and arbitrary colour. This operation is known, in image processing, by the name "application of an LUT (look-up table)". The image obtained is called a "false-colour image" since the colours visible on the image are artificial colours which do not correspond to the real colours. For example, the colour red can be associated with a high level of grey and the colour blue with a very low level of grey. The intermediate levels of grey are associated with colours graduated between red and blue. It will thus be understood that, for example, a light situated facing the sensor will have a necessarily red image (high level of grey). It will not therefore be possible to know whether it is a case of a dipped headlight of a vehicle or a brake light. It is therefore not possible to exactly interpret the objects situated in the road scene in front of the vehicle. In other words, these colouring operations may make it possible to improve the perception of an image by revealing information which a simple monochrome display does not make it possible to identify. They do nevertheless remain artifices and in no way render the true colour of the objects. For example, in the case of infrared night vision, objects with the same visible colour (for example green) may have radically opposed behaviours in infrared. One may appear bright or light because, apart from the wavelengths giving it its green colour, the object reflects near infrared (active system) or, because of its temperature, emits far infrared (passive system). The other may appear dark because it absorbs the near infrared and, because of its low temperature, does not emit far infrared.

SUMMARY OF THE INVENTION

The aim of the invention is precisely to remedy some or all of the drawbacks of the techniques disclosed above. To this end, it proposes a night vision system for producing a colour infrared image of the road scene situated in front of the vehicle. For this purpose, the invention proposes to use a colour sensor.

The invention preferably concerns a night vision system for a road scene comprising at least one projection device emitting infrared light towards the road scene and a first sensor for capturing a first infrared image of the road scene, the sensor being a colour sensor.

Advantageously, the colour sensor is a sensor detecting radiation at least in the visible range, in particular mainly in the visible range.

The device emitting infrared radiation may, for example, be chosen from amongst one or more incandescent lamps, one or more light-emitting diodes functioning in the infrared or one or more laser diodes.

In another preferred embodiment of the invention, it is also sought to avoid the dazzling which is obtained by means of a conventional active system. For this purpose, the invention proposes to associate, with the first colour sensor, a second monochrome sensor. More precisely, this preferred embodiment proposes a system comprising a second monochrome sensor for capturing a second infrared image of the road scene, the first image being a colour image and the second image being a monochrome image.

Advantageously, the monochrome sensor is a sensor detecting radiation at least in the infrared wavelengths. It can also detect other radiation, in particular in the visible range.

Optionally, it is also possible to have recourse to a visible light source, which can in fact be the vehicle headlights, when these are functioning in particular in dipped beam mode.

The invention also concerns a method for using the night vision system of the invention. It is a case of a night vision method for a road scene in which an infrared light beam is emitted in the direction of the road scene, with the following operations:

capturing a first colour image of the road scene,
capturing a second monochrome infrared image of the road scene,
combining the first and second images of the road scene, and
obtaining a colour infrared image of the road scene.

DESCRIPTION OF EXAMPLES

The invention concerns a colour night vision system. This system comprises a device for projecting an infrared light towards the road scene, in front of the vehicle, and at least one sensor for capturing the image of this road scene, this sensor being a colour sensor. In other words, this first sensor, which is placed in or on the vehicle, is a colour sensor capable of capturing a colour image of the road scene. This image is an image in real colours.

In a preferred embodiment of the invention, this colour sensor is associated with a second sensor, which for its part is monochrome. In this way, the monochrome sensor, which is a sensor with high infrared sensitivity, captures an infrared image of the road scene. Simultaneously or almost simultaneously, the colour sensor captures a colour image of the road scene. These two images, in colour and infrared, are then combined so as to form one and the same colour infrared image of the road scene.

Figure 7:
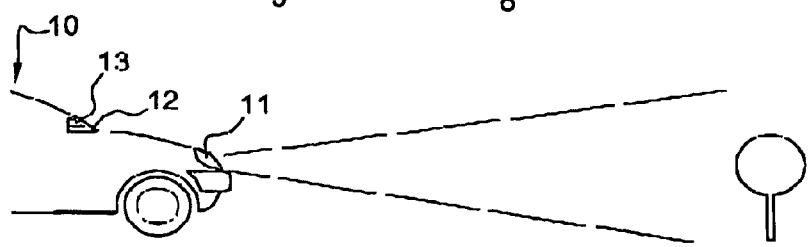
FIG. 7 depicts schematically the night vision system according to the invention.

An example of the system of the invention is shown diagrammatically in FIG. 7. This FIG. 7 shows a motor vehicle 10 provided with the night vision system of the invention. This system comprises a device for projecting infrared radiation 11, or projector. As shown in FIG. 7, this projector can be installed for example in one of the front lights of the vehicle. It is also possible to install a projector in each front light of the vehicle. The projector can also be installed in a special housing, for example between the two front lights of the vehicle.

The system of the invention also comprises a colour sensor 12. This colour sensor can advantageously be combined with a monochrome sensor 13. In this case, the two sensors are connected together so as to be synchronous or quasi-synchronous. Image processing means, not shown in the figure for reasons of simplification, are connected to the sensors in order to process the images supplied by these sensors. These processing means can be of the electronic type, mounted for example on a PCB dedicated to this processing. They can also be of the computing type, incorporated for example in the on-board computer of the vehicle.

In the preferred embodiment, the monochrome sensor is chosen so as to have high sensitivity to the rays which it may detect, in particular to infrared radiation, especially in the near infrared. This sensor is monochrome since, in general terms, current monochrome sensors are appreciably more sensitive than colour sensors. A high-sensitivity sensor can capture the most information possible, with maximum tolerated dazzle. It is considered that a sensor is very sensitive to infrared when it is in particular capable of detecting radiation between 800 and 1200 nm, in particular between 850 and 1100 nm. for example around 1000 to 1100 nm.

In order to express more concretely to what such a sensitivity corresponds, it is possible to give the following example: a high-sensitivity sensor is capable of detecting a minimum number of watts, for example equivalent to the energy reflected by a tree trunk at 100 to 200 meters on which an intensity of one or more tens of watts in the 800-1000 nm hand is sent. Thus the image captured by this monochrome sensor is very light and contains most possible information but, on the other hand, it suffers dazzle from adverse sources.

On the other hand, the sensitivity of the colour sensor is not preponderant. It is therefore possible to use a colour sensor having a sensitivity less than that of the monochromes sensor, for example a sensitivity 10 to 100 times less high. Such a colour sensor, said to be of low sensitivity, can therefore capture radiation approximately 10 to 100 times greater than that picked up by the high-sensitivity sensor without blooming. "Blooming" will be understood to mean the fact that an image has a spot which is saturated and which is larger than that of the image of the source on the sensor. To take a concrete example, if the tree trunk mentioned above is taken, the sensor said to be insensitive will be able for example to detect it only at approximately 30 meters, while the so-called high-sensitivity sensor could do it at 100 meters, when a sensitivity ratio between the two sensors of approximately 100 is chosen (it is the square of the distance which operates).

The image captured by the colour sensor must contain substantially no blooming. All the intense light sources must be point sources and comprise substantially no halo. It is thus possible to obtain an image showing the true light sources without false information due to blooming. These real light sources are then shown in colour. The colour image obtained is essentially composed of coloured spots corresponding to the light sources.

The night vision system of the preferred embodiment of the invention is based on the capture of two synchronous or quasi-synchronous images of the same road scene, with substantially different exposure parameters so that:

one of the images is of light as is permitted by the monochrome sensor in order to detect the greatest possible information, and the other image is much darker so that only the elements liable to dazzle the light image are in particular visible, and in colour.

Figure 4:
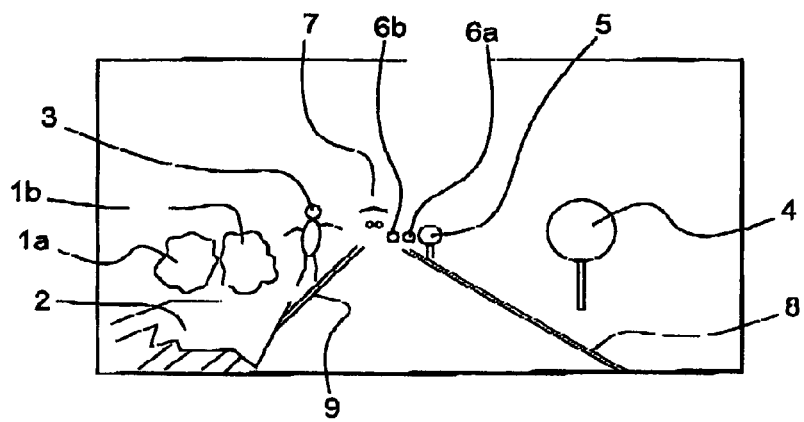
FIG. 4 depicts an example of a road scene image taken by a highly sensitive monochrome sensor.

An example of a light image, captured by the monochrome sensor, is depicted in FIG. 4. This image shows the various elements detected in the road scene by the high-sensitivity sensor. Amongst these elements there can be seen two halos of light 1*a* and 1*b*, a third halo of light projected on the ground 2, a pedestrian 3, white lines 8 and 9, signs 4 and 5 and white spots 6*a*, 6*b*, 7.

Figure 1:
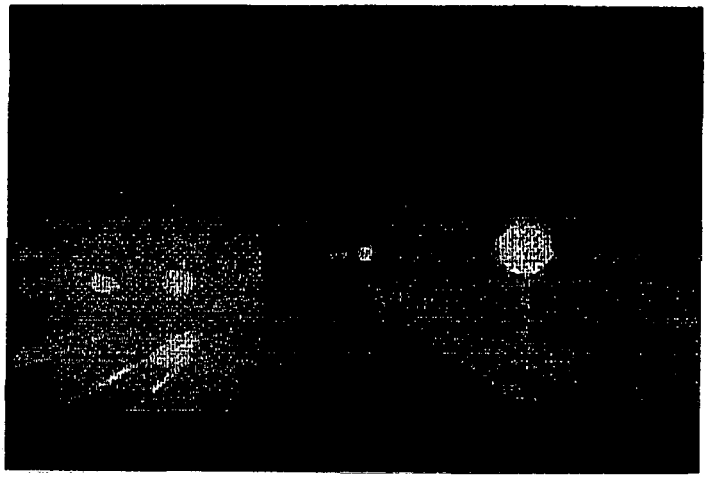
FIG. 1, already described, depicts an example of a road scene image taken by a conventional active system.
Figure 2:
FIG. 2, already described, depicts an example of a road scene image taken by a conventional passive system.
Figure 3:
FIG. 3, already described, depicts an example of a road scene image taken by a passive system and which has undergone video reversal.
Figure 5:
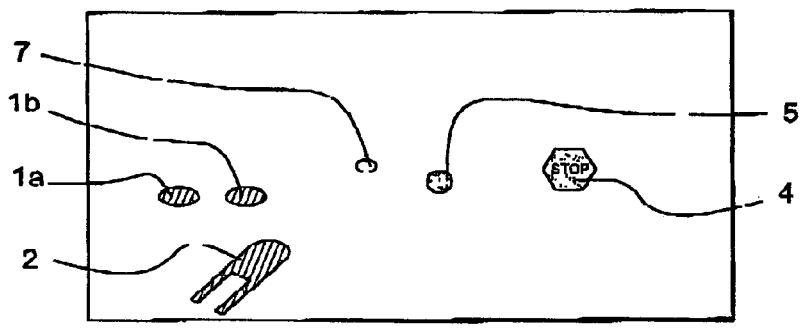
FIG. 5 depicts an example of a road scene image taken by a colour sensor of low sensitivity.

An example of a dark image, captured by the colour sensor, is shown in FIG. 5. This image shows solely the elements which were the most dazzling in FIG. 4. Amongst these elements, there can be seen the halos 1*a*, 1*b*, 2 and 7 which are shown with hatching to symbolize the colour yellow and the signs 4 and 5 which are shown with flecks to symbolise the colour red. This is because, on a real image of a road scene corresponding to that in FIG. 1 the image taken by the colour sensor would show yellow elements and others red. It will be understood that all the other colours can also appear on the image, for example if a three-colour light is present in the road scene, the bottom light would appear as green in the image and the intermediate light amber.

This dark image in FIG. 5 makes it possible in particular to show the inscription on the road signs. It is thus possible to know that it is a case of a stop sign.

The monochrome light image and the colour dark image are then combined in order to form only one and the same image of the road scene. This processing can consist of an operation of averaging the two images. In other words, an average is made between each pixel of the colour image and the corresponding pixel of the monochrome image in order to form an infrared image in colour of the road scene. This new image comprises both the information relating to the colours supplied by the colour image and the detailed information supplied by the monochrome image.

The fusion or combination of the monochrome light image and the dark image in colour gives a very sensitive image of the road scene (whilst being devoid of any dazzle) and where the light sources and bright objects are coloured.

Figure 6:
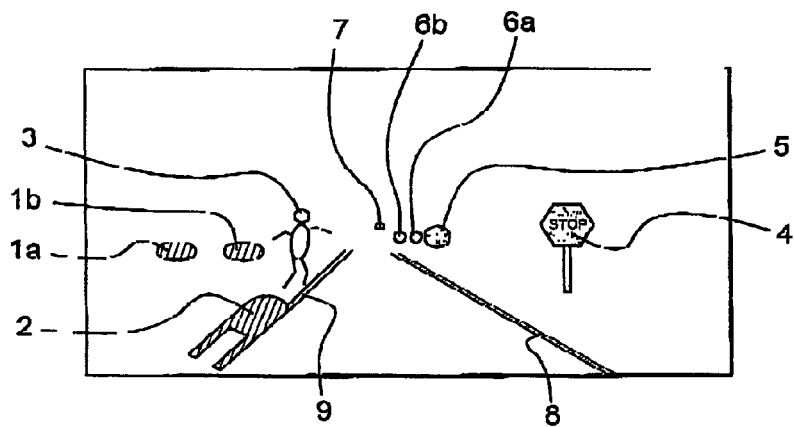
FIG. 6 depicts an example of a road scene image obtained by composition of the images in FIGS. 4 and 5.

FIG. 6 depicts an example of a road scene image obtained by combining a light monochrome image with a dark colour image. In other words, the image in FIG. 6 is the image obtained by combining the image in FIG. 4 with the image in FIG. 5. In this example, the combination is a pixel by pixel average of the images in FIGS. 4 and 5. This combination can however be other than an average. It may for example be a weighted average or of the type described in the patent filed on 29 Mar. 2002 in France under the filing number 02-04170.

This combined image of FIG. 6 shows both the elements which were not very bright in FIG. 4 and the coloured elements in FIG. 5. Thus the pedestrian 3 and the white lines 8 and 9 can be seen. It is also possible to see the yellow front lights 1*a* and 1*b* of the vehicle coming in the opposite direction, the reflection on the ground 2 of these front lights and the red road signs 4 and 5 with the inscription "Stop" on the sign 4.

In another example of a road scene, a three colour light or rear brake lights or front illuminating lights or direction indicators could appear on the image with a colour corresponding to the actual colour of the said lights. It is therefore very easy for the driver to know which types of light are involved, to be able then to interpret the image and to react according to this interpretation.

The invention therefore concerns a very sensitive black and white sensor with a less sensitive colour sensor. It is also possible to use only one colour sensor, then chosen this time so as to be very sensitive.

The invention also concerns the motor vehicle equipped with the night vision system according to the invention.

What is claimed is:

1. Night vision system for a road scene comprising:
   at least one projection device for emitting near infrared light towards a road scene;
   a first sensor for capturing a first image of the road scene, the first sensor being a colour sensor for capturing said first image without blooming, said first image being a colour image;
   a second sensor for capturing a second image of the road scene using the near infrared light, the second sensor being a monochrome infrared sensor, sensitive to infrared radiation from 800 nm to 1200 nm, for capturing said second image with blooming, said second image being a monochrome infrared image, said first sensor and said second sensor being synchronous or quasi-synchronous; and
   an image processing means for combining said colour image without blooming with said monochrome infrared image with blooming;
   wherein the first sensor has a sensitivity 10 to 100 times less than a sensitivity of the second sensor.

2. The night vision system according to claim 1, being mounted to a motor vehicle.

3. Road scene night vision method, in which a near infrared light beam is emitted in a direction of a road scene, which comprises the following operations:
- providing a first sensor for capturing a colour image of the road scene, the first sensor capturing the colour image without blooming;
- providing a second sensor, sensitive to infrared radiation from 800 nm to 1200 nm, for capturing a monochrome infrared image of the road scene using the near infrared light, the second sensor capturing the monochrome infrared image with blooming, said first sensor and said second sensor being synchronous or quasi-synchronous;
- capturing a colour image of the road scene without blooming;
- capturing a monochrome infrared image of the road scene with blooming;
- combining the colour and monochrome infrared images of the road scene, and
- obtaining a colour infrared image of the road scene, wherein the first sensor has a sensitivity 10 to 100 times less than a sensitivity of the second sensor.

4. The road scene night vision method according to claim 3, wherein the combining of the first and second images comprises a pixel by pixel averaging of said first and second images.

5. Night vision system for a road scene comprising:
- at least one projection device emitting near infrared light towards a road scene;
- a first sensor for capturing a first image of the road scene, the first sensor being a colour sensor for capturing said first image without blooming, said first image being a colour image;
- a second sensor for capturing a second image of the road scene using the near infrared light, the second sensor being a black and white sensor, sensitive to infrared radiation from 800 nm to 1200 nm, for capturing an infrared black and white image of the road scene with blooming, said first sensor and said second sensor being synchronous or quasi-synchronous; and
- an image processing means for combining said colour image without blooming with said black and white image with blooming;

wherein a sensitivity of said first sensor being 10 to 100 times lower in comparison to a sensitivity of said second sensor.

6. Road scene night vision method, in which a near infrared light beam is emitted in a direction of a road scene, which comprises the following operations:
- providing a first sensor for capturing a colour image of the road scene, the first sensor capturing the color image without blooming;
- providing a second sensor, sensitive to radiation from 800 nm to 1200 nm, for capturing a black and white infrared image of the road scene using the near infrared light, the second sensor capturing the monochrome infrared image with blooming, said first sensor and said second sensor being synchronous or quasi-synchronous;
- capturing a colour image of the road scene without blooming;
- capturing a monochrome infrared image of the road scene with blooming;
- combining the colour and black and white infrared images of the road scene, and
- obtaining a colour infrared image of the road scene, wherein the first sensor has a sensitivity 10 to 100 times less than a sensitivity of the second sensor.

* * * * *